United States Patent
Lukic et al.

(10) Patent No.: US 10,352,736 B2
(45) Date of Patent: *Jul. 16, 2019

(54) ROTATING LASER

(71) Applicant: Hilti Aktiengesellschaft, Schaan (LI)

(72) Inventors: Sasha Lukic, Buchs (CH); Patrick Lampert, Mauren (LI); Stelios Gasnakis, Zurich (CH); Franz Felsberger, Chur (CH)

(73) Assignee: Hilti Aktiengesellschaft, Schaan (LI)

( * ) Notice: Subject to any disclaimer, the term of this patent is extended or adjusted under 35 U.S.C. 154(b) by 614 days.

This patent is subject to a terminal disclaimer.

(21) Appl. No.: 14/763,677

(22) PCT Filed: Jan. 21, 2014

(86) PCT No.: PCT/EP2014/051109
§ 371 (c)(1),
(2) Date: Jul. 27, 2015

(87) PCT Pub. No.: WO2014/118031
PCT Pub. Date: Aug. 7, 2014

(65) Prior Publication Data
US 2015/0362345 A1    Dec. 17, 2015

(30) Foreign Application Priority Data
Jan. 29, 2013 (DE) .................. 10 2013 201 419

(51) Int. Cl.
*G01D 11/24* (2006.01)
*G01C 15/04* (2006.01)

(52) U.S. Cl.
CPC ........... *G01D 11/245* (2013.01); *G01C 15/04* (2013.01); *G01D 11/24* (2013.01)

(58) Field of Classification Search
CPC ......................... G01D 11/24; G01D 11/245
(Continued)

(56) References Cited

U.S. PATENT DOCUMENTS 6,068,821 A * 5/2000 VanDeGraaf .............. A61L 2/28
206/521.2
6,128,326 A * 10/2000 Kousek ................ G01C 15/004
356/247
(Continued)

FOREIGN PATENT DOCUMENTS

CN        202126245 U    1/2012
DE        202006014576   1/2008
(Continued)

*Primary Examiner* — Jamel E Williams
(74) *Attorney, Agent, or Firm* — Davidson, Davidson & Kappel, LLC

(57) ABSTRACT

A rotating laser (30), including a device housing (31) having a base housing (35), a rotating head (36) and three or more handles (37), whereby the base housing (35) includes a bottom surface (38), a top surface (39) opposite from the bottom surface (38) and a side surface (41) that connects the bottom and top surfaces (38, 39), and a measuring unit (32) that is arranged at least partially inside the device housing (31), whereby the handles (37) have a first segment with a grip element (45), and a lower shock absorbing element (49) at the lower end (43) of the handles (37) facing away from the rotating head (36), and the lower shock absorbing elements (49) project relative to the bottom surface (38) in an axial direction parallel to the axis of rotation (34).

19 Claims, 5 Drawing Sheets

(58) Field of Classification Search
USPC .......................................................... 73/431
See application file for complete search history.

(56) References Cited

U.S. PATENT DOCUMENTS

| | | | |
|---|---|---|---|
| 6,195,901 B1 | 3/2001 | Falb | |
| 6,421,360 B1 | 7/2002 | Kousek et al. | |
| 7,392,592 B2 | 7/2008 | Bublitz | |
| D609,124 S * | 2/2010 | Ishii | D10/66 |
| 8,915,626 B2 * | 12/2014 | Lettermann | G01C 15/004 |
| | | | 362/153.1 |
| 2004/0064959 A1 | 4/2004 | Kallabis | |
| 2004/0111898 A1 * | 6/2004 | Marshall | G01C 15/002 |
| | | | 33/227 |
| 2007/0153532 A1 * | 7/2007 | Milligan | G01C 15/004 |
| | | | 362/362 |
| 2008/0043409 A1 * | 2/2008 | Kallabis | F16P 1/02 |
| | | | 361/824 |
| 2009/0058012 A1 | 3/2009 | Walters et al. | |
| 2009/0257060 A1 * | 10/2009 | Birlem | B65H 63/032 |
| | | | 356/429 |
| 2010/0031521 A1 | 2/2010 | Stefan et al. | |
| 2011/0315834 A1 * | 12/2011 | Lukic | F16M 11/18 |
| | | | 248/125.8 |
| 2015/0362345 A1 * | 12/2015 | Lukic | G01C 15/04 |
| | | | 250/239 |

FOREIGN PATENT DOCUMENTS

| | | | |
|---|---|---|---|
| EP | 2400204 | 12/2001 | |
| EP | 2400204 A2 * | 12/2011 | ............. F16M 11/18 |
| WO | WO98/32472 | 7/1998 | |
| WO | WO9832472 | 7/1998 | |
| WO | WO2006076935 | 7/2006 | |
| WO | WO 2014118031 A1 * | 8/2014 | ............. G01C 15/04 |

\* cited by examiner

ROTATING LASER

The present invention relates to a rotating laser comprising a device housing and a measuring unit.

BACKGROUND

Known measuring devices comprise a housing and a measuring unit arranged inside the device housing. FIG. 1 shows a prior-art measuring device 10 configured as a rotating laser, consisting of a device housing 11 and of a measuring unit 12 that is arranged in the device housing 1 and that is shown schematically in FIG. 1. The device housing 11 of the rotating laser 10 has a base housing 13, a rotating head 14 and several handles 15. The base housing 13 is configured to be essentially cylindrical and it comprises a bottom surface 16, a top surface 17 opposite from the bottom surface 16 and a side surface 8 that connects the bottom and top surfaces 16, 17. The rotating head 14 comprises a cover element 21 that is connected to the top surface 17 of the base housing 13 via several crosswise webs 22 that are connected to each other. The handles 15 comprise a grip element 23 as well as an upper attachment element 24 and a lower element 25 for attaching the handles 15 to the base housing 13. FIG. 1 shows a variant in which the handles 15 are snapped onto the base housing 13 at the upper end 26 and screwed onto the base housing 13 at the lower end 27.

The various sections of the device housing 11, which are configured as the base housing 13, the rotating head 14 and the handles 15, are made of thermoplastics and consist either of a hard thermoplastic or else of a hard thermoplastic and a soft thermoplastic-elastomeric plastic produced by means of a multi-component injection-molding process. The cover element of the rotating head and the handles consist of a first and second material configured as a hard thermoplastic and of a soft thermoplastic-elastomeric plastic. Due to the design and the materials employed, the prior-art measuring devices are not sufficiently sturdy in case of impact or a fall from a drop height of more than 1 meter.

SUMMARY OF THE INVENTION

It is an object of the present invention to provide a sturdy device housing for a rotating laser having a measuring unit arranged in the device housing, whereby the measuring unit is protected against damage in case of impact or a fall from a drop height of more than 1 meter. Moreover, aside from the measuring unit, the device housing and the device components attached to the device housing should also be protected.

The present invention provides that the handles have a first segment with a grip element and a lower shock absorbing element at the lower end of the handles facing away from the rotating head, whereby the lower shock absorbing elements project relative to the bottom surface in an axial direction parallel to the axis of rotation. Thanks to this configuration of the lower shock absorbing elements at the lower end of the handles, the device housing lands on the lower shock absorbing elements which then absorb the impact energy and dissipate it through the modality of elastic deformation. In case of impact or a fall, the bottom surface of the base housing is protected by the lower shock absorbing elements against the effect of direct force. The side surface of the base housing can be protected in that the lower shock absorbing elements are additionally configured on the sides.

The lower shock absorbing elements of the handles preferably have a standing surface for positioning the rotating laser on a substrate for horizontal laser operation. Since the lower shock absorbing elements project relative to the bottom surface of the base housing, the bottom surface that is normally provided as the standing surface is not suitable as the standing surface for the rotating laser.

In a preferred refinement, the first segments of the handles have an upper shock absorbing element at the upper end facing the rotating head. Thanks to the configuration of the upper shock absorbing elements at the upper end of the handles, the side surface of the base housing as well as the rotating head can be protected. The protective effect of the upper shock absorbing elements is particularly effective in conjunction with additional shock absorbing elements on the rotating head and in conjunction with the lower shock absorbing elements of the handles. A lateral orientation of the upper shock absorbing elements protects the side surface of the base housing, while an orientation towards the rotating head protects the rotating head. Here, it should be taken into account that the extension of the upper shock absorbing elements towards the rotating head is limited by the fact that the laser beam rotating around the axis of rotation is not supposed to be interrupted by the upper shock absorbing elements.

The first segments of the handles are preferably made of a first material, whereby the first material is an elastomeric or thermoplastic-elastomeric plastic with a rebound resilience of less than 40% and a Shore-A hardness of less than 80, and the volume content of the first segments amounts to at least 70%. In the case of a rotating laser with three or more handles, the base housing can be protected by the handles against the effect of direct force on the side surface. In case of impact or a fall, the device housing lands on the protruding handles, which can absorb and dissipate the impact energy through the modality of elastic deformation. The number of handles and the dimensions of the handles are harmonized with each other in such a way that the side surface of the base housing is behind the outermost tangential connection surface between adjacent handles. The properties of the first material determine the amount of impact energy that the handles can dissipate through the modality of elastic deformation. The higher the amount of impact energy dissipated through the modality of elastic deformation, the smaller the amount of energy that can act on the measuring unit.

Depending on their mechanical behavior under the influence of heat, plastics are divided into thermoplastics, thermosetting plastics, and elastomeric plastics. Thermoplastics are non-crosslinked plastics that can be repeatedly deformed; the more they are heated, the better they can be deformed. Whether a thermoplastic is hard or soft at room temperature depends on its glass transition temperature; it is soft and can be deformed above the glass transition temperature, whereas it is hard and cannot be deformed below the glass transition temperature. Familiar thermoplastics are, for example, polyolefins (PE, PP), styrene plastics (PS, ABS, SAN), polyesters (PBT, PC), polyacetals (POM) and polyamides (PA). The main method for shaping thermoplastics is injection molding.

Elastomers or rubber materials are dimensionally stable, elastically deformable plastics that are elastically deformed under tensile and compressive load, after which they return to their original non-deformed shape. Elastomeric plastics are rubbers (e.g. natural rubber (NR), nitrile-butadiene rubber (NBR), ethylene-propylene-diene rubber (EPDM), silicon rubber (LSR, RTV)) and polyurethane (PUR) elastomers. Polyurethane is a versatile plastic; a suitable reaction regimen and proper selection of the monomers yield polyurethanes having different degrees of crosslinking Closely crosslinked polyurethane is hard as well as tough and resilient, and it is belongs to the thermosetting plastics. In contrast, loosely crosslinked polyurethane is soft and rubbery-elastic, and it belongs to the elastomeric plastics. Non-crosslinked polyurethane has the properties of a thermoplastic. Thanks to its excellent mechanical and physical properties, polyurethane produced by means of foaming is used in the construction sector as PUR rigid foam, but it is also used as permanently flexible PUR foam for technical applications. As a special group of elastomers, the thermoplastic elastomers (TPE), for example, on the basis of olefins (TPE-O), on the basis of styrenes (TPE-S) or on the basis of urethanes (TPE-U), combine the typical properties of elastomers with the processing capabilities of thermoplastics.

The rebound resilience (R) is a characteristic value of elastomeric plastics; it is defined in the standard DIN 53512 and it serves to evaluate the elasticity behavior when subjected to impact. The standard ISO 4662 applies to rubber. In order to determine the rebound resilience, a defined pendulum hammer strikes a test specimen; the working capacity of the pendulum hammer is 0.5 J. A semispherical peen with a diameter of 15 mm is employed as the pendulum hammer. The rebound resilience is calculated on the basis of the deflection of the pendulum hammer. The release angle is 90° and the length of the pendulum hammer is 200 mm. The rebound resilience (R) is calculated from the quotient of the rebound height divided by the starting height times one hundred.

The Shore hardness is a characteristic value of elastomeric plastics and it is defined in the standards DIN 53505 and DIN 7868. The measuring methods differ for soft elastomers and tough elastomers. A Shore-A hardness is determined for soft elastomers whereas a Shore-D hardness is determined for tough elastomers. The Shore-A hardness is measured with a rod that has a tip with a truncated cone having an end face with a diameter of 0.79 mm and an opening angle of 35°; the applied mass is 1 kg and the holding time is 5 seconds. The Shore-D hardness is measured with a rod that has a tip with a conical point having a radius of 0.1 mm and an opening angle of 30°; the applied mass is 5 kg and the holding time is 15 seconds. Normally, a precision of ±5 units is assumed for the Shore hardness.

Preferably, the volume content of the first material in the first segment of the handles amounts to at least 50%. Owing to a volume content of elastomeric or thermoplastic-elastomeric plastic amounting to at least 50%, it is ensured that the impact energy will be absorbed by the device housing, even in case of drop heights of more than 1 meter, and will not be transferred to the measuring unit, thus protecting the measuring unit against damage.

In a first variant, the volume content of the first material in the first segments of the handles is 100%. The higher the volume content of the first material in the first segment of the handles, the greater the amount of impact energy that is dissipated through the modality of elastic deformation.

In a second, alternative variant, the first segments of the handles are made of another material, whereby the other material differs from the first material. The other material can be, for example, an elastomeric plastic, a thermoplastic-elastomeric plastic, a thermoplastic or a metal. The selection of the other material in the first segments of the handles depends on the requirements being made of the handles.

Especially preferably, the first segments of the handles have an elastically flexible insert element that is made of the other material. Damping, reinforcing or process-related functions can be integrated into the insert element in the first segment of the handle. The selection of the other material and of the shape of the insert element depends on the requirements being made of the handles.

Especially preferably, the handles have a second segment made of a second material with at least one attachment element for attaching the handles to the base housing, whereby the second material is a hard thermoplastic or a metal. The second material is used in the areas of the handles that are adjacent to other housing sections and that have to be connected to them. The second material configured as a hard thermoplastic or as a metal permits a good connection of the handles to the base housing. Here, the second segments of the handles especially preferably comprise an upper attachment element at the upper end facing the rotating head and a lower attachment element at the lower end facing away from the rotating head for attaching the handles to the base housing. The upper and lower attachment elements ensure a permanent attachment of the handles to the base housing in case of impact or a fall.

Especially preferably, the second segment has an elastically flexible connection element in the connection area leading to the first segment. The connection element enlarges the connection surface between the first and the second segments of the handle. The larger the connection surface, the better the connection between the first and second segments. Moreover, if properly configured, the connection element can function like a spring element that is deformed elastically and that subsequently returns to its original shape.

In a preferred refinement, the rotating head comprises a first segment that is configured as a top element and that is made of a first material, and it comprises a second segment that has several crosswise webs and that is made of a second material, whereby the first material is an elastomeric or thermoplastic-elastomeric plastic with a rebound resilience of less than 40% and a Shore-A hardness of less than 80, and the second material is a hard thermoplastic or a metal. The properties of the first material are selected with an eye towards achieving a high energy dissipation. An elastomeric or thermoplastic-elastomeric plastic with a rebound resilience of less than 40% and a Shore-A hardness of less than 80 protects the rotating head against damage in case of impact or a fall from a drop height of more than 1 meter. The second material permits a secure connection of the rotating head to the surrounding sections of the device housing.

Especially preferably, the volume content of the first segment amounts to at least 50%. A volume content of the first segment amounting to at least 50% in the rotating head ensures that, in case of drop heights of more than 1 meter, if the device is dropped on the rotating head, the impact energy will be absorbed and dissipated by the device housing and will not be transferred to the measuring unit.

The volume content of the first material in the first segment of the rotating head especially preferably amounts to at least 50%. Owing to a volume content of elastomeric or thermoplastic-elastomeric plastic amounting to at least 50%, it is ensured that, even in case of drop heights of more than 1 meter, the impact energy will be absorbed by the rotating head and will not be transferred to the measuring unit, thus protecting the measuring unit against damage.

In a first variant, the volume content of the first material in the first segments of the rotating head is 100%. The higher the volume content of the first material in the first segment of the rotating head, the greater the amount of impact energy that is dissipated through the modality of elastic deformation.

In a second, alternative variant, the first segment of the rotating head is made of another material, whereby the other material differs from the first material. The other material can be, for example, an elastomeric plastic, a thermoplastic-elastomeric plastic, a thermoplastic or a metal. The selection of the other material depends on the requirements being made of the rotating head.

Especially preferably, the first segment of the rotating head has an elastically flexible insert element that is made at least partially of the other material. Damping, reinforcing or process-related functions can be integrated into the insert element in the first segment of the rotating head. The selection of the other material and of the shape of the insert element depends on the requirements being made of the rotating head.

The first segment of the rotating head especially preferably comprises at least one shock absorbing element. Thanks to this configuration of shock absorbing elements on the cover element, in case of impact or a fall, the device housing lands on the shock absorbing elements, which absorb the impact energy and dissipate it through the modality of elastic deformation. In case of impact or a fall, the shock absorbing elements protect the cover element and the crosswise webs of the rotating head against the effect of direct forces. The protective effect of the shock absorbing elements on the rotating head is particularly effective in conjunction with the upper shock absorbing elements of the handles.

A lateral orientation of the upper shock absorbing elements of the handles protects the side surface of the base housing, while an orientation towards the rotating head protects the rotating head. Here, it should be taken into account that the extension of the upper shock absorbing elements and of the shock absorbing elements on the rotating head is limited by the fact that the laser beam rotating around the axis of rotation is not supposed to be interrupted by the shock absorbing elements.

Especially preferably, the number of shock absorbing elements of the rotating head matches the number of handles. Here, the shapes of the shock absorbing elements of the rotating head and of the upper shock absorbing elements of the handles are harmonized with each other since the protective effect of the shock absorbing elements of the rotating head is particularly effective in conjunction with the upper shock absorbing elements of the handles.

In a preferred embodiment, the first segments of the handles have an upper shock absorbing element at the upper end facing the rotating head, and the rotating head has several shock absorbing elements, whereby the number of shock absorbing elements of the rotating head matches the number of handles. Rotating lasers are particularly well protected when the handles each have lower and upper shock absorbing elements and when the rotating head likewise has several shock absorbing elements, whereby the number of shock absorbing elements of the rotating head matches the number of handles. Thanks to this configuration of the shock absorbing elements on the handles and on the rotating head, the entire base housing of the rotating laser can be protected.

The outer surfaces of the grip elements and of the shock absorbing elements that strike an obstacle or land on the ground in case of impact or a fall of the rotating laser especially advantageously enclose an obtuse angle between 90° and 180°. Owing to this configuration of the outer surfaces, the rotating laser can roll on the ground in case of impact or a fall and can thus dissipate some of the impact energy.

BRIEF DESCRIPTION OF THE DRAWINGS

Embodiments of the invention will be described below with reference to the drawing. The drawing does not necessarily depict the embodiments true-to-scale, but rather, the drawing has been made schematically and/or in slightly distorted form whenever necessary for the sake of clarity. Regarding any additions to the teaching that can be gleaned directly from the drawing, reference is hereby made to the pertinent state of the art. In this context, it should be taken into consideration that a wide variety of modifications and changes can be made relating to the shape and the detail of a given embodiment without departing from the general idea of the invention. The features of the invention disclosed in the description, in the drawing as well as in the claims can be essential for the refinement of the invention, either individually or in any desired combination. Moreover, all combinations of at least two of the features disclosed in the description, in the drawing and/or in the claims fall within the scope of the invention. The general idea of the invention is not limited to the exact form or detail of the preferred embodiment shown and described below, nor is it limited to a subject matter that would be limited in comparison to the subject matter being put forward in the claims. At given rated ranges, values that fall within the cited limits are also to be disclosed as limit values and can be used and claimed in any desired manner. For the sake of clarity, identical or similar parts or else parts with an identical or similar function are designated below by the same reference numerals.

The following is shown.

DETAILED DESCRIPTION

Figure 1:
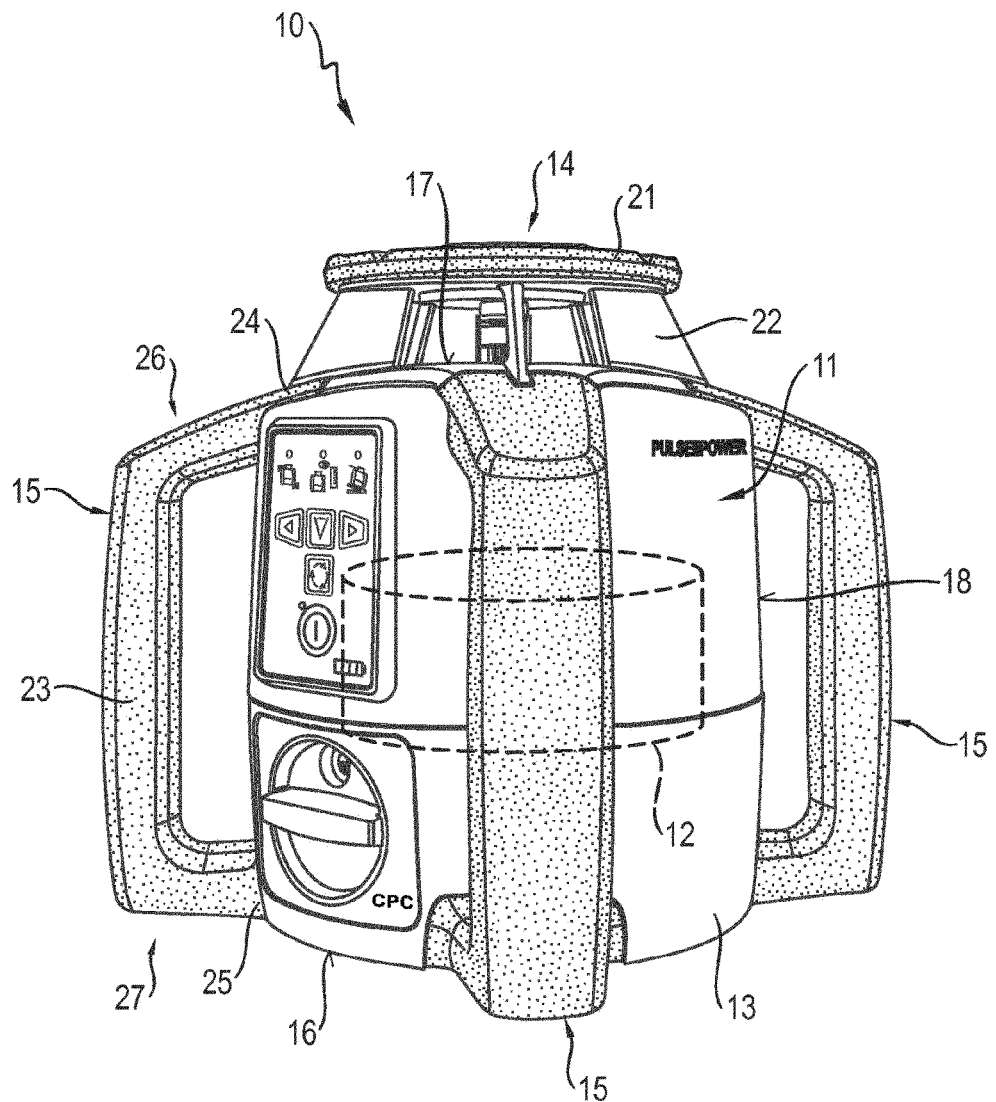
FIG. 1 a prior-art measuring device configured as a rotating laser with a device housing consisting of a base housing, a rotating head and several handles.
Figure 2:
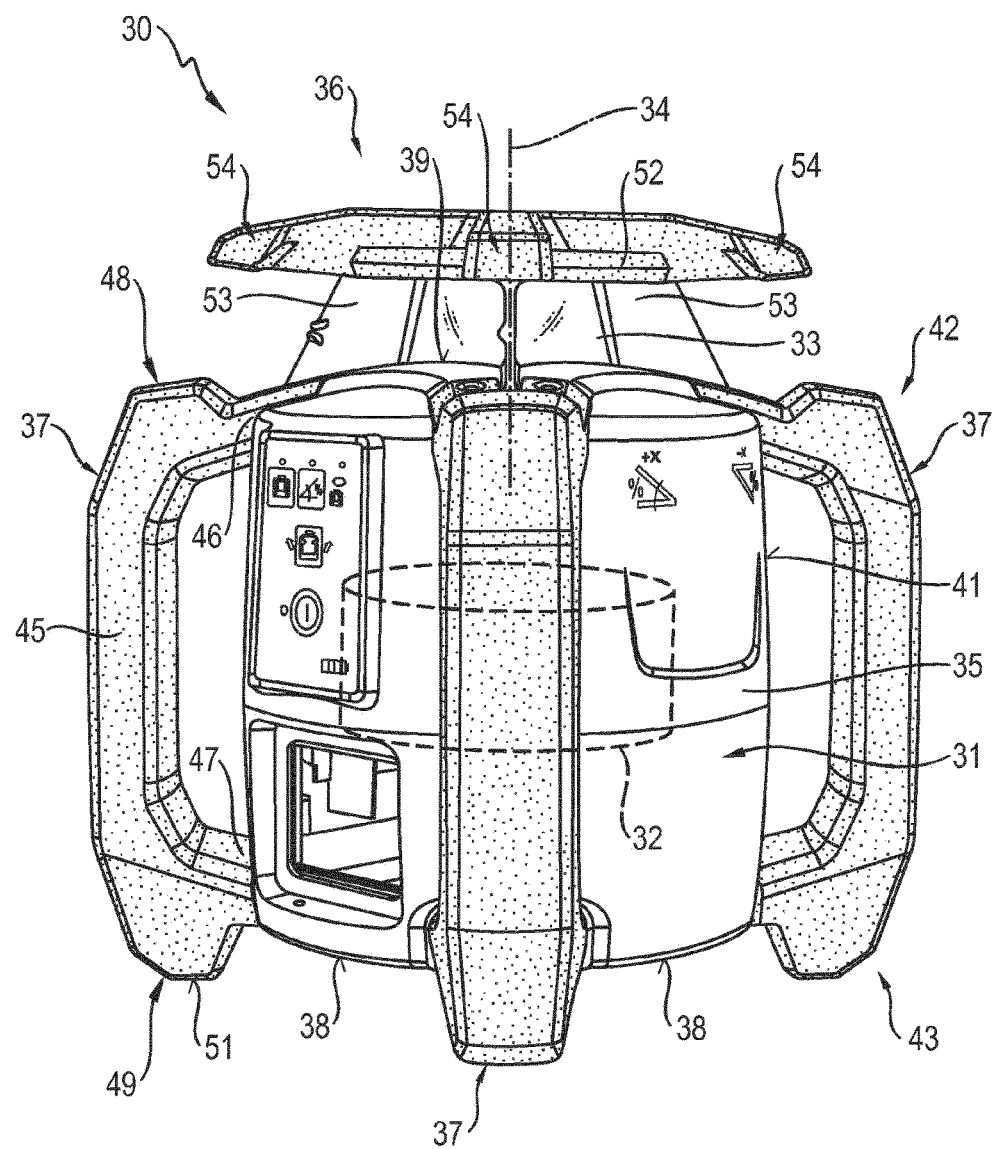
FIG. 2 a measuring device according to the invention in the form of a rotating laser with a device housing consisting of a base housing, a rotating head and several handles, whereby the rotating head and the handles consist of several parts made of an elastomeric plastic and a thermoplastic.

FIG. 2 shows a measuring device 30 according to the invention that is configured as a rotating laser. The rotating laser 30 comprises a device housing 31 and a measuring unit 32 that is arranged inside the device housing 31 and that is shown schematically in FIG. 2. The measuring unit 32 generates a laser beam in a radiation source, and this laser beam strikes a rotating optical deflector 33. The laser beam exits from the radiation source in an axial direction and it is deflected by 90° in a radial direction by means of the optical deflector 33. The optical deflector 33 rotates around the axis of rotation 34 that runs parallel to the axial direction of the emitted laser beam.

The device housing 31 of the rotating laser 30 comprises a base housing 35, a rotating head 36 and several handles 37. FIG. 2 shows a device housing 31 with four identically configured handles 37 that are arranged uniformly around the base housing 35. As an alternative, the device housing 31 can have one, two, three or more than four handles 37, and/or the handles can be configured differently. In a device housing 31 with at least three handles 37, the handles 37 can have a standing surface for positioning the rotating laser 30 in an upright arrangement on a substrate.

The base housing 35 comprises a bottom surface 38, a top surface 39 opposite from the bottom surface 38 and a side surface 41 that connects the bottom and top surfaces 38, 39. The rotating head 36 is connected at the top surface 39 to the base housing 35, and the handles 37 are attached to the base housing 35 at the upper end 42 facing the rotating head 36 and at the lower end 43 facing away from the upper end 42.

The handle 37 comprises a grip element 45 for holding the rotating laser 31 as well as an upper attachment element 46 and a lower attachment element 47 for attaching the handle 37 to the base housing 35. The handle 37 additionally comprises an upper shock absorbing element 48 at the upper end 42 and an lower shock absorbing element 49 at the lower end 43. The shock absorbing elements 48, 49 improve the energy absorption and the energy dissipation in the handle 37 in case of impact or a fall. The lower shock absorbing elements 49 each have a standing surface 51 by means of which the rotating laser 30 is positioned in an upright arrangement on a substrate for horizontal laser operation. Thanks to this configuration of the lower shock absorbing elements 49 at the lower end 43 of the handles 37, in case of impact or a fall in the direction of the bottom surface 38, the device housing 31 lands on the lower shock absorbing elements 49, which absorb the impact energy and dissipate it. In case of impact or a fall, the bottom surface 38 of the base housing 35 is protected by the lower shock absorbing elements 49 against the effect of direct force.

The rotating head 36 protects the optical deflector 33 and it comprises a cover element 52 and several crosswise webs 53 that are connected to each other and that attach the rotating head 36 to the top surface 39 of the base housing 35. The crosswise webs 53 are configured to be as narrow as possible so that they only interrupt the laser beam to the smallest extent possible. On the cover element 52, there are several shock absorbing elements 54 that project relative to the cover element 52 in the axial direction parallel to the axis of rotation 34 as well as parallel to the laser plane perpendicular to the axis of rotation 34. Thanks to this configuration of the shock absorbing elements 54 on the cover element 52, in case of impact or a fall, the device housing 31 lands on the shock absorbing elements 54, which absorb and dissipate the impact energy. In case of impact or a fall, the shock absorbing elements 54 protect the cover element 52 and the crosswise webs 53 of the rotating head 36 against the effect of excessive direct forces.

The shape of the grip elements 45 and of the shock absorbing elements 48, 49, 54 is selected with an eye towards achieving a high energy dissipation. The surfaces of the grip elements 45 and of the shock absorbing elements 48, 49, 54 that strike an obstacle or land on the ground in case of impact or a fall each enclose an obtuse angle between 90° and 180°. Owing to this configuration of the surfaces, the rotating laser can roll on the ground in case of impact or a fall and can thus dissipate some of the impact energy. Moreover, the grip elements 45 and the shock absorbing elements 48, 49, 54 are made of an elastic, energy-absorbing plastic and they additionally dissipate impact energy through the modality of elastic deformation.

Figure 3A:
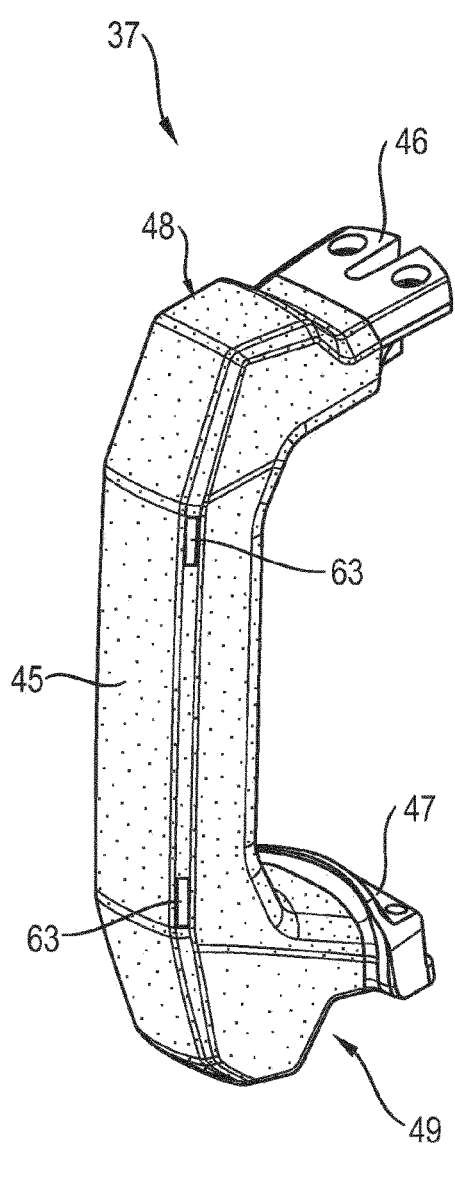
FIGS. 3A, B the structure of the handles of the rotating laser of FIG. 2 in a three-dimensional view (FIG. 3A) and in a section through the handle parallel to the axis of rotation of the rotating laser (FIG. 3B)
Figure 3B:
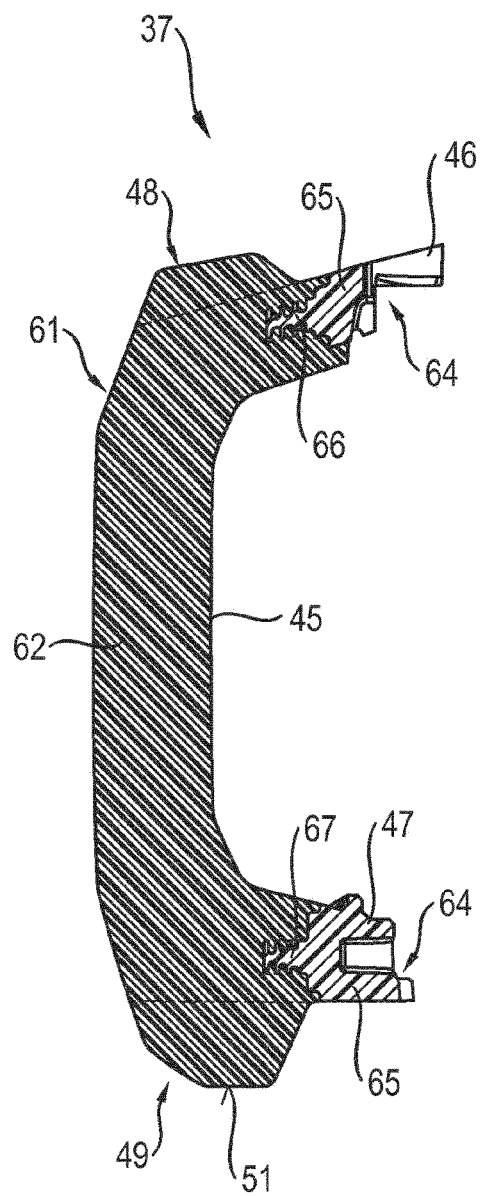

FIGS. 3A, B show the structure of the handles 37 of the rotating laser 30 of FIG. 2 in a detailed view, whereby FIG. 3A shows the handle 37 in a three-dimensional view and FIG. 3B shows a cross section through the handle 37 parallel to the axis of rotation 34 of the rotating laser 30 in FIG. 2.

The grip element 45, the upper shock absorbing element 48 and the lower shock absorbing element 49 form the first segment 61 of the handle 37. The first segment 61 is made of a first material 62 configured as an elastomeric plastic with a rebound resilience of less than 40% and a Shore-A hardness of less than 80. The properties of the elastomeric plastic 62 for the first segment 61 have been selected with an eye towards achieving a high energy dissipation in case of impact or a fall, and furthermore, the grip element 45 should be sufficiently sturdy so that the rotating laser 30 can be held by the handles 37. Suitable elastomeric plastics for the first segment include PUR elastomers, also in foamed form, rubbers and thermoplastic elastomers. The grip element 45 is provided with placement elements 63 with which the rotating laser 30 can be positioned in a prone arrangement on a substrate for vertical laser operation.

The upper and lower attachment elements 46, 47 form a second segment 64 of the housing 37. The second segment 64 is made of a second material 65 configured as a thermoplastic and produced, for example, by means of an injection-molding process. A multi-component process is used to produce the first segment 61 with the grip element 45, the shock absorbing elements 48, 49 and the placement elements 63 as well as to connect the first segment 61 to the second segment 64 with the upper and lower attachment elements 46, 47.

In the connection area to the grip element 45, the upper and lower attachment elements 46, 47 each have an elastically flexible connection element 66, 67 that enlarges the connection surface between the first and second segments 61, 64. The larger the connection surface between the first and second segments 61, 64, the better the connection. Moreover, the connection element 66, 67 acts like a spring element that is elastically deformed and subsequently returns to its original shape. Aside from the connection elements in the form of a pine-tree structure 66, 67 shown in FIG. 3B, any shapes that enlarge the connection surface can also be used.

The second material 65 is configured as a thermoplastic and it is used in the areas of the handles 37 that adjoin other housing sections and that have to be connected to them. The hard thermoplastic 65 permits a good connection of the handles 37 to the base housing 35. Thermoplastics have the advantage over elastomeric plastics that they can be welded and that they can be permanently connected to surrounding housing sections by means of screwed connections.

Figure 4:
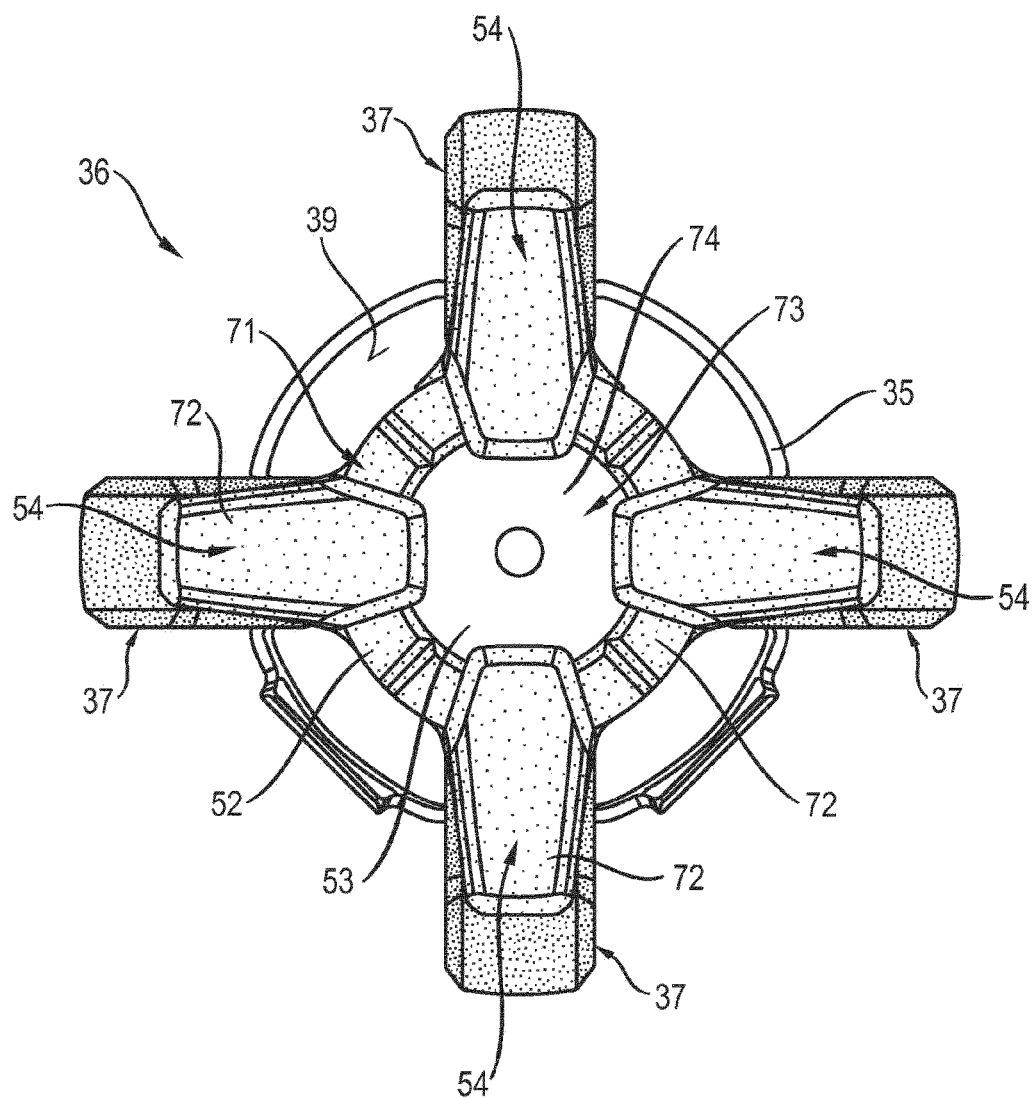
FIG. 4 the structure of the rotating head of the rotating laser of FIG. 2 in a view from the top.

FIG. 4 shows the structure of the rotating head 36 of the rotating laser 30 of FIG. 2 in a detailed top view. The rotating head 36 consists of the cover element 52, of several crosswise webs 53 and of several shock absorbing elements 54.

On the top facing away from the optical deflector 33, the cover element 52 has the shock absorbing elements 54 that project relative to the cover element 52 in the axial direction parallel to the axis of rotation 34 and parallel to the laser plane perpendicular to the axis of rotation 34. Moreover, the shock absorbing elements 54 project relative to the base housing 35 in the laser plane perpendicular to the axis of rotation 34. Thanks to this configuration of the shock absorbing elements 54 on the cover element 52, in case of impact or a fall, the device housing 31 lands on the shock absorbing elements 54, which absorb the impact energy and dissipate it. In case of impact or a fall, the shock absorbing elements 54 protect the cover element 52, the crosswise webs 53 and the optical deflector 33 of the rotating head 36 against the effect of excessive direct forces.

The cover element 52 and the shock absorbing elements 54 form a first segment 71 of the rotating head 36. The first segment 71 is made of a first material 72 that is configured as an elastomeric plastic with a rebound resilience of less than 40% and a Shore-A hardness of less than 80. The crosswise webs 53 that are connected to each other form a second segment 73 of the rotating head 36. The second segment 73 is made of a second material 74 that is configured as a thermoplastic.

Figure 5:
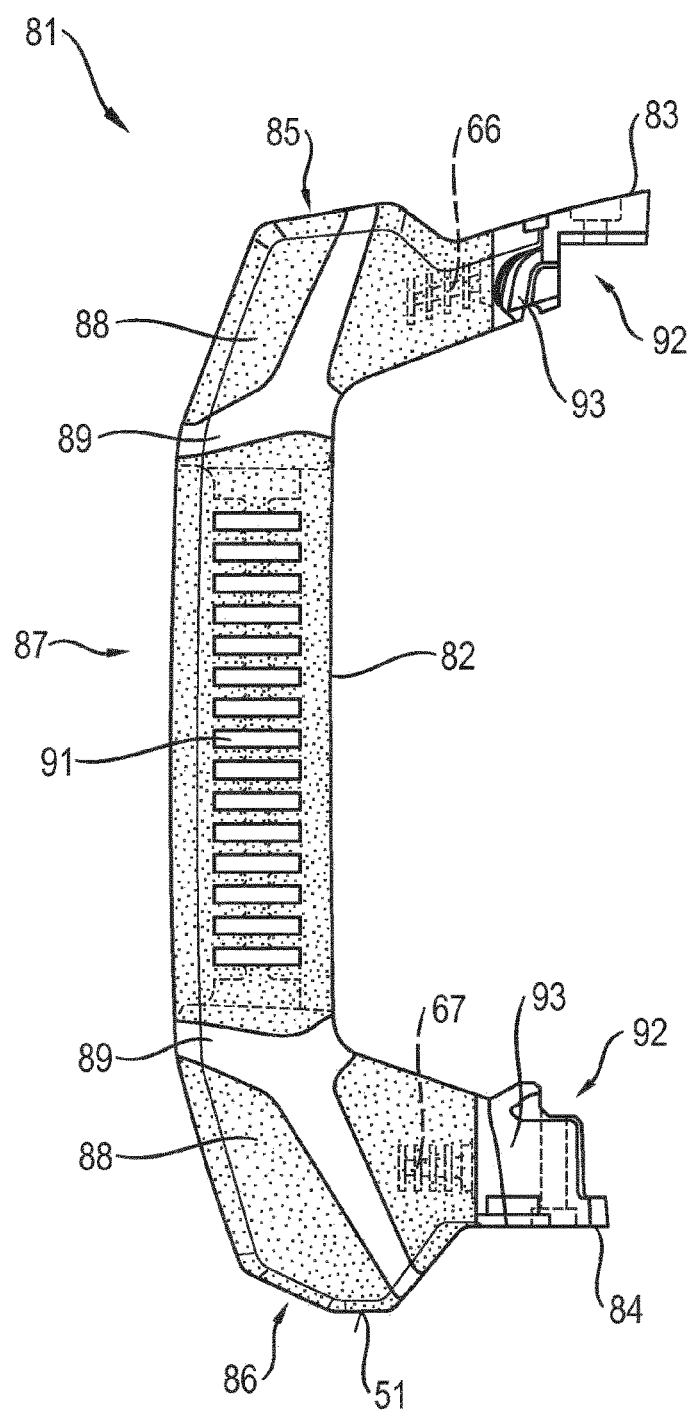
FIG. 5 an alternative embodiment of the handles for the rotating laser of FIG. 2.

FIG. 5 shows an alternative embodiment of a handle 81 for the rotating laser 30 of FIG. 2. In the rotating laser 30, the handle 81 replaces the handles 37. The handle 81 comprises a grip element 82, an upper attachment element 83, a lower attachment element 84, an upper shock absorbing element 85 and a lower shock absorbing element 86.

The grip element 82, the upper shock absorbing element 85 and the lower shock absorbing element 86 form the first segment 87 of the handle 81. The first segment 87 is made of a first material 88 that is configured as an elastomeric plastic with a rebound resilience of less than 40% and a Shore-A hardness of less than 80, as well as of another material 89. Here, the first segment 87 has a volume content of the first material 88 amounting to at least 50%. An insert element 91 that consists of the other material 89 and that can have additional damping, reinforcing or process-related functions is embedded in the first material 88. The upper and lower attachment elements 83, 84 form a second segment 92 that is made of a second material 93 configured as thermoplastic. The second segment 92 and the insert element 91 can be made of the same thermoplastic. As an alternative, the other material 89 of which the insert element 91 is made can be an elastomeric plastic that is different from the first material 88 or else a thermoplastic that is different from the second material 93.

FIG. 5 shows a handle 81 in which the insert element 91 is partially visible on the surface of the handle 81 and can be configured as a design element, for example, by selecting different colors for the materials 88, 89. As an alternative, the insert element 81 can be arranged in the handle 81 and can be completely surrounded by the elastomeric plastic 88. Moreover, the insert element in the grip element and the attachment elements can be made in one piece.

What is claimed is:

1. A rotating laser comprising:
    a device housing having a base housing, a rotating head and three or more handles, the base housing including a bottom surface, a top surface opposite from the bottom surface and a side surface connecting the bottom and top surfaces; and
    a measuring unit arranged at least partially inside the device housing, the measuring unit having a radiation source and an optical deflector being rotatable around an axis of rotation, wherein the radiation source emits a laser beam that is deflected at the optical deflector and rotated around an axis of rotation in a laser plane,
    the handles having a first segment with a grip element, a lower shock absorbing element at the lower end of the handles facing away from the rotating head, and an upper shock absorbing element at the upper end of the handles facing the rotating head, the lower shock absorbing elements projecting relative to the bottom surface in an axial direction parallel to the axis of rotation, and the upper shock absorbing elements being arranged in the axial direction parallel to the axis of rotation below the laser plane,
    the rotating head having a cover element made of a first material and several crosswise webs made of a second material, wherein the cover element has at least one cover element shock absorbing element projecting relative to the cover element in the axial direction parallel to the axis of rotation above the laser plane.

2. The rotating laser as recited in claim 1 wherein the lower shock absorbing elements have a standing surface for positioning the rotating laser on a substrate for horizontal laser operation.

3. The rotating laser as recited in claim 1 wherein a volume content of the first material in the first segments of the handles amounts to at least 50%.

4. The rotating laser as recited in claim 3 wherein the volume content of the first material in the first segments of the handles amounts to 100%.

5. The rotating laser as recited in claim 3 wherein the first segments of the handles include another material, the other material differing from the first material.

6. The rotating laser as recited in claim 5 wherein the first segments of the handles have an elastically flexible insert element made of the other material.

7. The rotating laser as recited in claim 1 wherein the handles have a second segment made of a second material with at least one attachment for attaching the handles to the base housing, the second material being a thermoplastic or a metal.

8. The rotating laser as recited in claim 7 wherein the second segment has an elastically flexible connection in a connection area leading to the first segment.

9. The rotating laser as recited in claim 1 wherein the rotating head includes a first segment configured as a top element and made of a first material, and includes a second segment having several crosswise webs made of a second material, the first material being an elastomeric or thermoplastic-elastomeric plastic with a rebound resilience of less than 40% and a Shore-A hardness of less than 80, and the second material being a hard thermoplastic or a metal.

10. The rotating laser as recited in claim 9 wherein a volume content of the first segment of the rotating head amounts to at least 50%.

11. The rotating laser as recited in claim 10 wherein a volume content of the first material in the first segment the rotating head amounts to at least 50%.

12. The measuring device as recited in claim 11 wherein the volume content of the first material in the first segment of the rotating head amounts to 100%.

13. The rotating laser as recited in claim 11 wherein the first segment of the rotating head includes another material, the other material differing from the first material.

14. The rotating laser as recited in claim 13 wherein the first segment of the rotating head has an elastically flexible insert element made at least partially of the other material.

15. The rotating laser as recited in claim 9 wherein the first segment of the rotating head includes at least one shock absorber.

16. The rotating laser as recited in claim 15 wherein a number of shock absorbers of the rotating head matches a number of the handles.

17. The rotating laser as recited in claim 15 wherein outer surfaces of the grips and of the shock absorber each enclose an obtuse angle between 90° and 180°.

18. The rotating laser as recited in claim 1 wherein the first segments of the handles have the upper shock absorber at the upper end facing the rotating head, and the rotating head has several head shock absorbers, whereby a number of head shock absorbers matches a number of the handles.

19. The rotating laser as recited in claim 1 wherein the first segments of the handles are made of a first material, the first material being an elastomeric or thermoplastic-elastomeric plastic with a rebound resilience of less than 40% and a Shore-A hardness of less than 80, and a volume content of the first segments amounts to at least 70%.

* * * * *